(12) United States Patent
Hatada

(10) Patent No.: US 10,060,733 B2
(45) Date of Patent: Aug. 28, 2018

(54) MEASURING APPARATUS

(71) Applicant: CANON KABUSHIKI KAISHA, Tokyo (JP)

(72) Inventor: Akihiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 15/252,641

(22) Filed: Aug. 31, 2016

(65) Prior Publication Data

US 2017/0069091 A1 Mar. 9, 2017

(30) Foreign Application Priority Data

Sep. 3, 2015 (JP) ................................. 2015-174016

(51) Int. Cl.
| | |
|---|---|
| *G01B 11/245* | (2006.01) |
| *G06T 7/521* | (2017.01) |
| *G02B 27/12* | (2006.01) |
| *G02B 27/14* | (2006.01) |

(52) U.S. Cl.
CPC .......... *G01B 11/245* (2013.01); *G02B 27/126* (2013.01); *G02B 27/141* (2013.01); *G06T 7/521* (2017.01); *G06T 2207/10024* (2013.01); *G06T 2207/10152* (2013.01); *G06T 2207/30164* (2013.01)

(58) Field of Classification Search
CPC ...... G01B 11/245; G06T 7/521; G02B 27/126
See application file for complete search history.

(56) References Cited

U.S. PATENT DOCUMENTS

| | | | |
|---|---|---|---|
| 5,608,529 | A | 3/1997 | Hori |
| 7,570,370 | B2 | 8/2009 | Steinbichler et al. |
| 8,577,176 | B2 | 11/2013 | Kotake et al. |

(Continued)

FOREIGN PATENT DOCUMENTS

| | | |
|---|---|---|
| DE | 102006048234 A1 | 4/2008 |
| JP | 2517062 B2 | 7/1996 |

(Continued)

OTHER PUBLICATIONS

Office Action issued in German Patent Application No. 102016116323.6 dated Feb. 21, 2017. English translation provided.

*Primary Examiner* — Nam Pham
(74) *Attorney, Agent, or Firm* — Rossi, Kimms & McDowell LLP

(57) ABSTRACT

A measuring apparatus includes an optical system including a wavelength dividing element that divides light from an object simultaneously illuminated by first and second illumination units into a light component of a first wavelength and a light component of a second wavelength. A first imaging element receives a pattern light of the first wavelength reflected by the object, which is light transmitted through the wavelength dividing element but never reflected by the wavelength dividing element, thereby obtaining a first image representing a three-dimensional shape of the object. A second imaging element receives the light of the second wavelength reflected by the object, which is light reflected by the wavelength dividing element, thereby obtaining a second image representing an edge of the object.

10 Claims, 4 Drawing Sheets

(56) References Cited

U.S. PATENT DOCUMENTS

2004/0125205 A1    7/2004   Geng
2015/0103358 A1    4/2015   Flascher
2015/0330775 A1*   11/2015   Basevi ................... G06T 7/521
                                                                               348/136

FOREIGN PATENT DOCUMENTS

| JP | 2006308323 A | 11/2006 |
| JP | 2012-215496 A | 11/2012 |
| JP | 5122729 B2 | 1/2013 |
| JP | 5393318 B2 | 1/2014 |

* cited by examiner

| TRANSMIT | | DETECTED PEAK SHIFT AMOUNT ON COORDINATES OF IMAGING ELEMENT | | |
|---|---|---|---|---|
| | | δxc | δyc | |
| ORIENTATION OF PRISM | Δx | 0 | 0 | μm |
| | Δy | 0 | 0 | μm |
| | Δz | 0 | 0 | μm |
| | Δωx | 0 | 6.4 | mrad |
| | Δωy | 6.4 | 0 | mrad |
| | Δωz | 0 | 0 | mrad |

| REFLECT | | δxc | δyc | |
|---|---|---|---|---|
| ORIENTATION OF REFLECTING SURFACE | Δx | 1 | 0 | μm |
| | Δy | 0 | 0 | μm |
| | Δz | -1 | 0 | μm |
| | Δωx' | 29.0 | 0 | mrad |
| | Δωy' | 0 | 42.0 | mrad |
| | Δωz' | 0 | 0 | mrad |

MEASURING APPARATUS

BACKGROUND OF THE INVENTION

Field of the Invention

The present invention relates to a measuring apparatus for measuring the shape of an object.

Description of the Related Art

Along with the recent advances of robot technologies, a robot takes on a complex process such as assembly of an industrial product. To implement assembly by the robot, it is necessary to measure the relative positions and orientations between an end effect such as a hand of the robot and a grip target component. A method of measuring the position and orientation of a target component is described in Japanese Patent No. 5393318. In the method described in Japanese Patent No. 5393318, fitting with a model such as CAD is performed using both edge information obtained from a grayscale image and a range image obtained by a three-dimensional measuring method such as a pattern projection method, thereby measuring the position and orientation of a target component.

To obtain the grayscale image and the range image from a single imaging element, the images need to be obtained by time shift or by separating them from one captured image. To adapt to speedup of the assembly process, the robot needs to measure the position and orientation of the target component while moving. Hence, if the images are obtained by time shift, a positional shift occurs between the images. If the images are obtained by separating them from one captured image, pattern light for the range image is superimposed on the edge of the target component. An edge detection error occurs in the grayscale image, and the measurement accuracy of the position and orientation lowers.

In Japanese Patent No. 5122729, an object is simultaneously illuminated with illumination for a grayscale image and illumination for a range image configured to project pattern light, which have different wavelengths. In the method described in Japanese Patent No. 5122729, light reflected by the object is condensed via an imaging lens and separated into two wavelengths by a wavelength dividing element such as a dichroic prism. After that, a grayscale image and a range image of the same time are obtained using two sensors.

In the method dichroic prism in Japanese Patent No. 5122729, a light beam is separated by the reflecting surface of the dichroic prism, thereby obtaining the range image and the grayscale image. If the reflecting surface is used as in Japanese Patent No. 5122729, the shift of the reflected light beam becomes larger than that of a transmitted light beam when the dichroic prism deforms or changes the position and orientation due to a vibration, a change in the orientation of the apparatus, or a change in the ambient temperature. In particular, when the range image is obtained by the principle of triangulation such as a pattern projection method, a measurement error amount associated with the shift amount of the light beam is amplified depending on the condition of the angle of convergence.

SUMMARY OF THE INVENTION

The present invention provides, for example, a measuring apparatus that improves lowering of accuracy caused by a wavelength dividing element.

According to one aspect of the present invention, a measuring apparatus is provided. The apparatus includes a first illumination unit configured to illuminate an object with pattern light of a first wavelength, a second illumination unit configured to illuminate the entire object brightly with light of a second wavelength different from the first wavelength, an optical system including a wavelength dividing element configured to divide the light from the object simultaneously illuminated by the first illumination unit and the second illumination unit into a light component of the first wavelength and a light component of the second wavelength, a first imaging element, a second imaging element, and a processor configured to process data of an image obtained by the first imaging element and data of an image obtained by the second imaging element, thereby obtaining information of a shape of the object, wherein the first imaging element receives the pattern light of the first wavelength reflected by the object, which is light transmitted through the wavelength dividing element but never reflected by the wavelength dividing element, thereby obtaining a first image representing a three-dimensional shape of the object, and the second imaging element receives the light of the second wavelength reflected by the object, which is light reflected by the wavelength dividing element, thereby obtaining a second image representing an edge of the object.

Further features of the present invention will become apparent from the following description of exemplary embodiments (with reference to the attached drawings).

DESCRIPTION OF THE EMBODIMENTS

Various exemplary embodiments, features, and aspects of the invention will be described in detail below with reference to the drawings.

First Embodiment

Figures 1, 2:
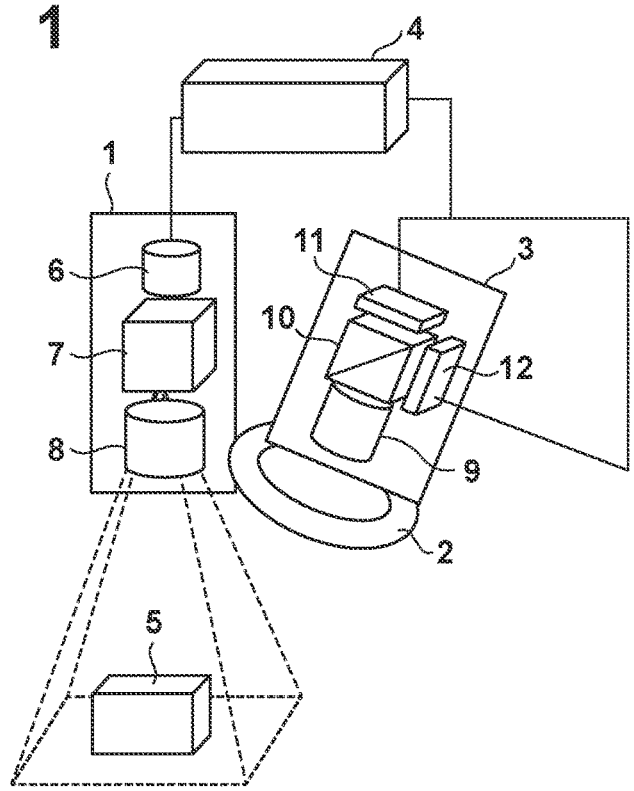
FIG. 1 is a view showing a measuring apparatus according to the first embodiment.
FIG. 2 is a view showing the sensitivity of light beam shift to the position and orientation of a dichroic prism.

A measuring apparatus according to the first embodiment, which measures the shape of an object, will be described with reference to FIG. 1. The measuring apparatus according to this embodiment includes a first illumination unit 1 for a range image (first image) representing the three-dimensional shape of an object, a second illumination unit 2 for a grayscale image (second image) representing the contour of an object, an imaging unit 3, and a processor 4. The first illumination unit 1 illuminates an object 5 with pattern light (first light) of a first wavelength. At the same time, the second illumination unit 2 illuminates the object 5 with second light of a second wavelength different from the first wavelength.

Figure 4:
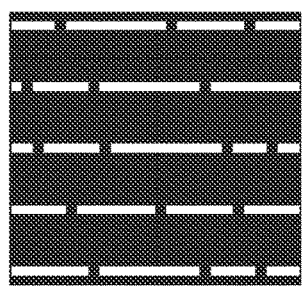
FIG. 4 is a view showing dot pattern light according to the first embodiment.

Measurement of the range image will be described first. The range image is obtained by a pattern projection method based on the principle of triangulation, and the three-dimensional shape information of the object 5 is generated as point group data. In this embodiment, the first illumination unit 1 for the range image includes a light source 6, a pattern light generation unit 7, and a projection lens 8. The pattern light generation unit 7 generates pattern light used to obtain the range image from the first light of the first wavelength emitted by the light source 6. The projection lens 8 enlarges the pattern light and illuminates the object 5 with the enlarged pattern light. Reflected light and scattered light from the object 5 are received by a first imaging element 11 via an imaging lens 9 and a dichroic prism 10 serving as a wavelength dividing element in the imaging unit 3, and the first image of the object 5 by the pattern light component (the light component of the first wavelength) is formed. The first imaging element 11 is, for example, a CCD or CMOS camera. The processor 4 detects the peak coordinates of the pattern light from the data of the first image by the pattern light formed by the first imaging element 11, and obtains (calculates) a range image based on the principle of triangulation. This embodiment assumes measurement of the object 5 that is moving, and the range is calculated from the data of one first image by the pattern light. For example, as described in Japanese Patent No. 2517062, the pattern light generation unit 7 generates dot pattern light encoded by dots. FIG. 4 shows an example of the dot pattern light. The processor 4 detects the positions of the dots from the image obtained by illuminating the object 5 with the dot pattern light, and associates the projected pattern with the captured image based on the positional relationship, thereby obtaining the range image from one image.

Measurement of the grayscale image will be described next. The grayscale image is the image (second image) of a grayscale by the light component of the second wavelength having a monochrome grayscale formed by a second imaging element 12. The processor 4 detects an edge corresponding to the contour or ridgeline of the object 5 from the data of the grayscale image, and uses the edge to measure the position and orientation of the object 5 as the feature of the image. In this embodiment, when measuring the grayscale image, the second illumination unit 2 such as ring illumination evenly illuminates the object 5 with the second light of the second wavelength. Reflected light and scattered light from the object 5 form an image on the imaging element 12 via the dichroic prism 10 by the imaging lens 9, and the image is captured. The processor 4 detects an edge corresponding to the contour or ridgeline of the object 5 from the data of the captured second image. There are various methods of detecting the edge, including the Canny method. In this embodiment, any method is usable. The processor 4 performs model fitting using the range image, the grayscale image, and the CAD data of the object 5 input in advance, thereby calculating the position and orientation of the object 5. In this embodiment, the imaging lens 9 and the dichroic prism 10 that is a wavelength dividing element form an imaging optical system.

As a point of the first embodiment, the dichroic prism 10 configured to separate the first light and the second light of different wavelengths into reflected light and scattered light is used, and the influence of a measurement error caused by the deformation or a change in the position and orientation of the dichroic prism 10 is suppressed. The dichroic prism 10 deforms or changes the position and orientation due to a vibration, a change in the orientation of the apparatus, or a change in the ambient temperature. In this case, the shift amount of the reflected light beam on the plane of the second imaging element 12 is larger than the shift amount of the transmitted light beam on the plane of the first imaging element 11. For example, FIG. 2 shows the shift amounts of the transmitted light beam and the reflected light beam on the planes of the first imaging element 11 and the second imaging element 12, which are generated by a change in the position and orientation of the dichroic prism 10 that is a 17-mm cube. As for the transmitted light beam, the light beam does not shift with respect to the position shift of the dichroic prism 10. A shift of the light beam occurs only when the orientation about an axis perpendicular to the optical axis of the imaging optical system changes. On the other hand, as for the reflected light beam, a shift of the light beam is caused even by a change in the position and orientation of the reflecting surface of the dichroic prism 10. In addition, the shift amount of the reflected light beam is several times larger than that of the transmitted light beam.

The method of obtaining the range image according to this embodiment is the pattern projection method by the principle of triangulation. A measurement error $\Delta Z$ that occurs when the peak coordinates of the pattern light intensity detected by this method shift is given by $$\Delta Z = \delta Xc \times (\text{pixel size of first imaging element on object plane})/\tan\theta \quad (1)$$

where $\delta XC$ is the shift amount [pixel] of the peak coordinates of the pattern light intensity on the coordinate system on the plane of the first imaging element, and $\theta$ is the angle of convergence that is the angle made by the optical axis of the first illumination unit 1 for the range image and the optical axis of the imaging optical system.

On the other hand, a measurement error $\Delta P(x,y)$ for the edge position coordinates detected in the grayscale image is given by $$\Delta P(x,y) = \delta PC(xC, yC) \times (\text{pixel size of second imaging element on object plane}) \quad (2)$$

where $\delta PC(xC, yC)$ is the shift amount [pixel] of the position of edge detection on the coordinate system on the plane of the second imaging element.

Figure 3:
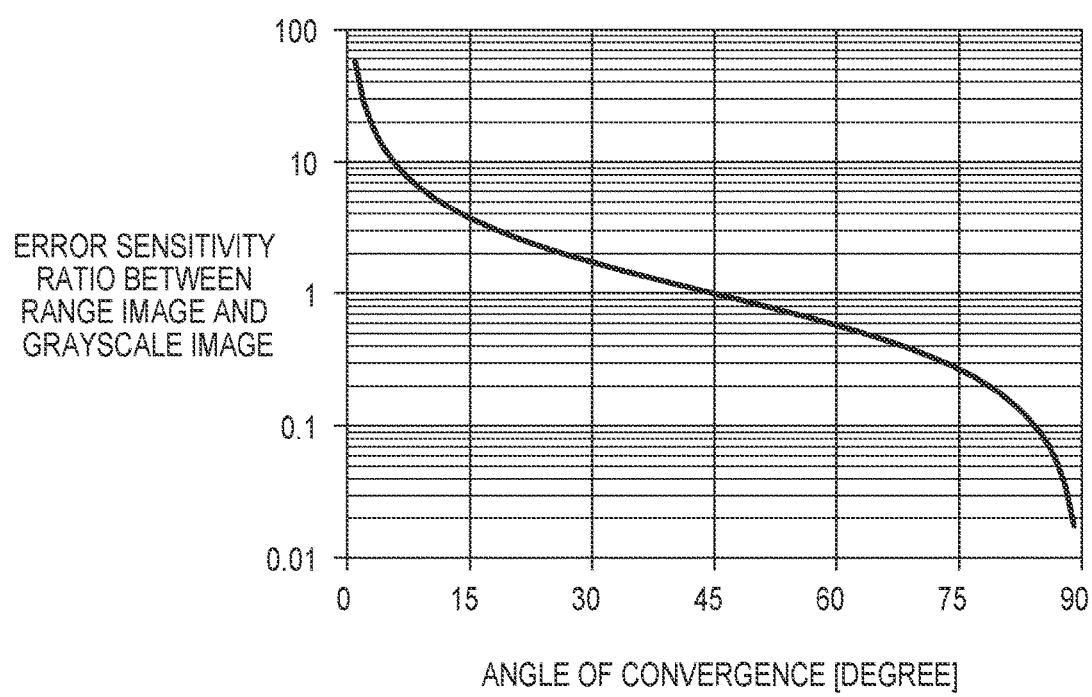
FIG. 3 is a graph showing the measurement error ratio between a range image and a grayscale image by the angle of convergence.

As indicated by equation (2), the measurement error of the edge position is obtained by simply the shift amount on the coordinate system on the plane of the second imaging element by the pixel size of the imaging element on the object plane. Using equations (1) and (2), FIG. 3 shows a change in the ratio of measurement error sensitivity to the shift amount of the light beam on the first and the second imaging elements between the range image and the grayscale image by the angle $\theta$ of convergence. For example, assume that the base line length that is the principal point distance between the first illumination unit 1 and the imaging unit 3 is 50 mm, and the working distance to the object 5 is 200 mm. In this case, the angle of convergence is about 11°, and the amount of an error to the shift of the light beam in the same amount is four times larger in the range image.

To measure the range image by the pattern projection method, the measurement range needs to be ensured by stopping down the projection lens 8 and thus attaining the depth of field. To perform accurate measurement under this condition, a high-intensity LED light source can be used as the light source 6. As the LED light source, the three primary colors, that is, red, green, and blue are available. The wavelength of the highest intensity is blue (450 to 470 nm). Hence, a blue LED is used as the light source for the range image, and an optical characteristic to pass light of the blue wavelength is imparted to the dichroic prism 10. This makes it possible to guarantee accuracy even in a state in which a sufficient exposure time cannot be ensured because of not only a change in the position and orientation of the prism 10 but also, for example, measurement of the object 5 that is moving.

Figure 7:
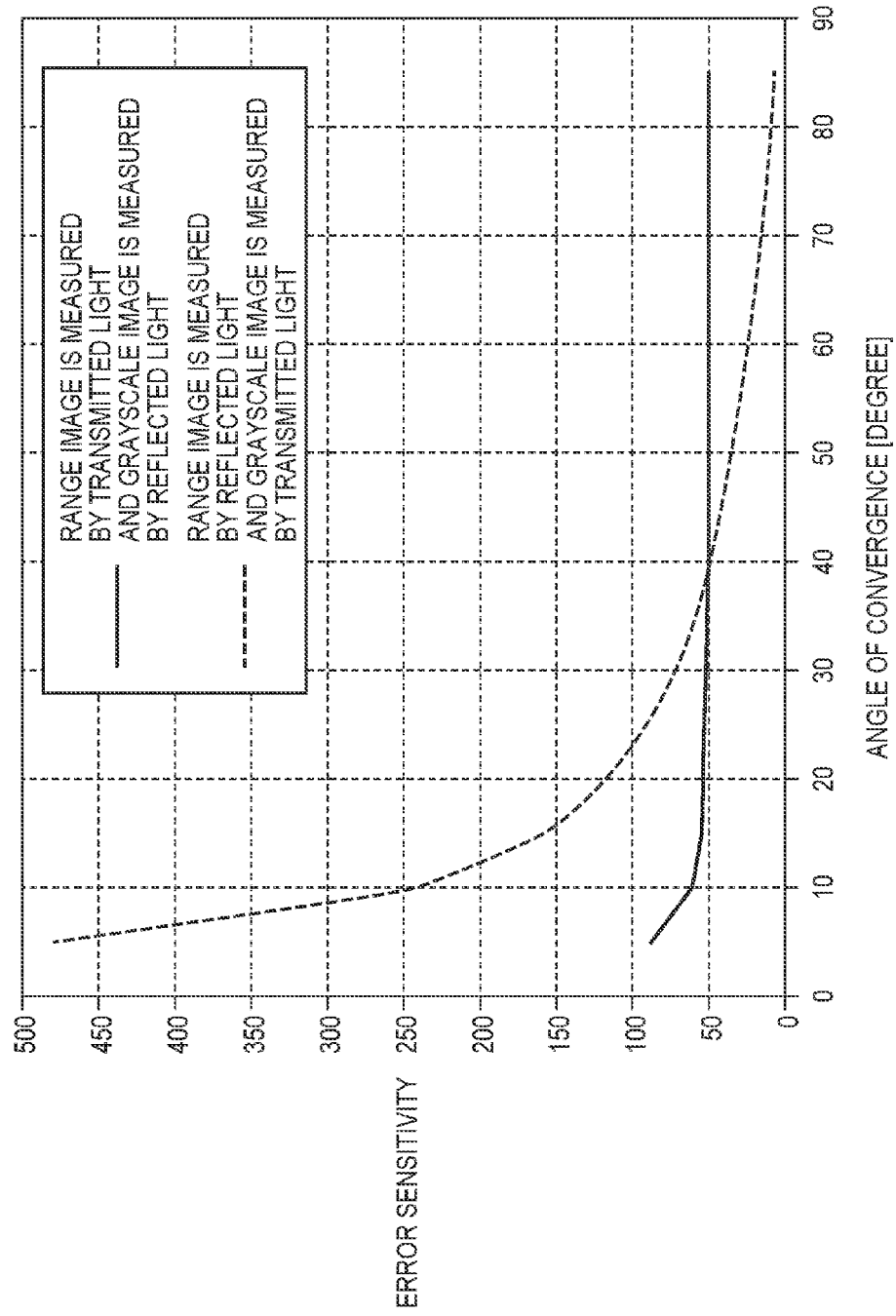
FIG. 7 is a view showing the sensitivity of light beam shift by the position and orientation of a dichroic prism.

FIG. 7 shows the relationship between the measurement error sensitivity and the angle of convergence by the position and orientation of the prism 10. In FIG. 7, the solid line indicates the relationship in a case in which the range image is measured using light transmitted through the prism 10, and the grayscale image is measured using light reflected by the prism 10. The broken line indicates the relationship in a case in which the range image is measured using light reflected by the prism 10, and the grayscale image is measured using light transmitted through the prism 10. In this embodiment, under the condition that the angle of convergence is small, the measurement error sensitivity to the light beam shift is higher in the range image than in the grayscale image. However, the accuracy can be guaranteed by obtaining the range image from the transmitting direction of the dichroic prism 10 in which the shift amount of the light beam is small. On the other hand, when the grayscale image is obtained from the reflecting direction of the dichroic prism 10, the shift amount of the light beam in the reflecting direction for the grayscale image becomes large. However, under the condition that the angle of convergence is small, the measurement error sensitivity to the light beam shift is low in the grayscale image. Hence, the measurement accuracy of the grayscale image can be guaranteed.

In this embodiment, the angle of convergence is set to be smaller than 39° based on FIG. 7, and the first imaging element 11 receives the first light transmitted through the dichroic prism 10 and the second light reflected by the dichroic prism 10. This makes it possible to guarantee almost the same measurement accuracy for both the measurement results of the range image and the grayscale image and ensure the measurement accuracy of the measuring apparatus. Note that in this embodiment, the wavelength dividing element divides incident light into transmitted light and reflected light. However, there is a wavelength dividing element that divides incident light into, for example, light transmitted through the wavelength dividing element but never reflected, light reflected without being transmitted through the wavelength dividing element, and light transmitted through and reflected by the wavelength dividing element. In this case, the first imaging element 11 receives the light transmitted but never reflected by the wavelength dividing element 10 and the light reflected by the wavelength dividing element at least once.

Second Embodiment

Figure 5:
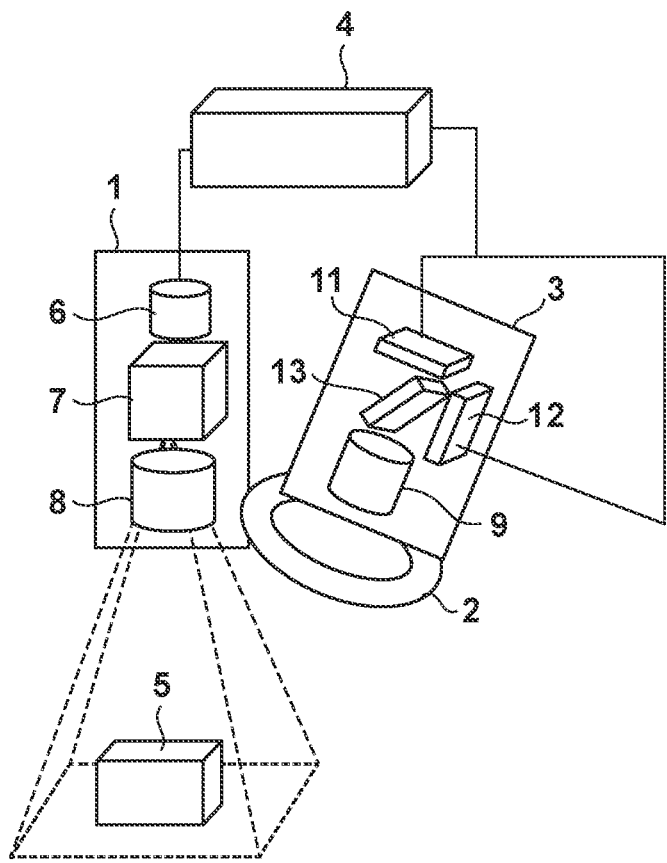
FIG. 5 is a view showing a measuring apparatus according to the second embodiment.

A measuring apparatus according to the second embodiment will be described with reference to FIG. 5. The measuring apparatus according to the second embodiment includes a first illumination unit 1 for a range image, a second illumination unit 2 for a grayscale image, an imaging unit 3, and a processor 4. A description of parts common to the first embodiment will be omitted.

The measuring apparatus according to the second embodiment includes a parallel plate dichroic mirror 13 as a wavelength dividing element. In the second embodiment, since the parallel plate wavelength dividing element is used, the rigidity of the wavelength dividing element itself lowers, and the shift of a reflected light beam increases, unlike the prism-shaped wavelength dividing element of the first embodiment. When the parallel plate dichroic mirror 13 is used, the distance to pass a transmitted light beam in the medium is shortened, and therefore, the shift of the transmitted light beam becomes small. Hence, the second embodiment is effective particularly under the conditions that the angle of convergence is small and that the measurement error sensitivity of the range image to the shift of the light beam is high. Additionally, the second embodiment is advantageous because the cost is low as compared to the prism shaped wavelength dividing element.

Figure 6:
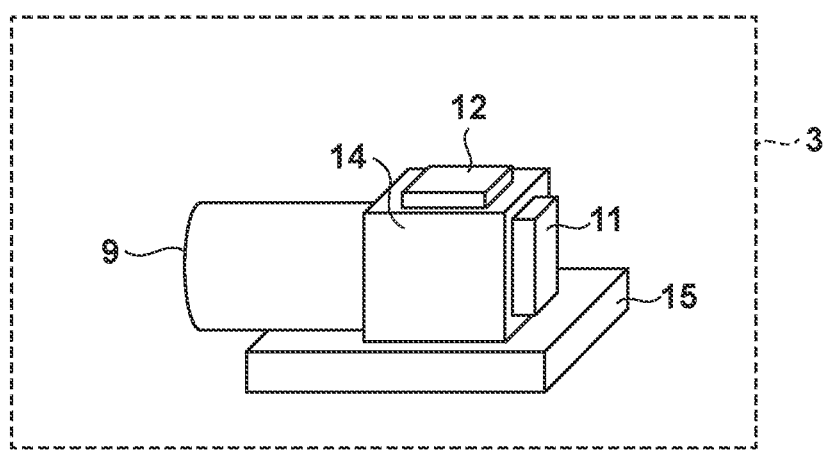
FIG. 6 is a view showing a modification of an imaging unit according to the second embodiment.

As described above, the shift of the light beam on the imaging element plane contributes to the measurement accuracy. However, it is necessary to assume that the first imaging element 11 shifts with respect to the light beam even without the shift of the light beam in actuality. As a measure, a holding unit 14 that fixes and holds the first imaging element 11 to the imaging optical system, is used, as shown in FIG. 6. As compared to a case in which the first imaging element 11 and the imaging lens 9 are independently held on a housing 15, the rigidity between the imaging lens 9 and the first imaging element 11 can be increased, and therefore, the shift of the relative position of the first illumination unit 11 becomes small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-174016, filed Sep. 3, 2015, which is hereby incorporated by reference herein in its entirety.

What is claimed is:

1. A measuring apparatus comprising:
a first illumination unit configured to illuminate an object with pattern light of a first wavelength;
a second illumination unit configured to illuminate the object with light of a second wavelength different from the first wavelength;
an optical system including a wavelength dividing element configured to divide the light from the object illuminated by the first illumination unit and the second illumination unit into a light component of the first wavelength and a light component of the second wavelength;
a first imaging element;
a second imaging element; and
a processor configured to process data of an image obtained by the first imaging element, and data of an image obtained by the second imaging element,
wherein the first imaging element receives the pattern light of the first wavelength reflected by the object, which is light transmitted through the wavelength dividing element but never reflected by the wavelength dividing element, thereby obtaining a first image representing a three-dimensional shape of the object, and
the second imaging element receives the light of the second wavelength reflected by the object, which is light reflected by the wavelength dividing element, thereby obtaining a second image representing an edge of the object.

2. The apparatus according to claim 1, wherein an angle made by an optical axis of the first illumination unit and an optical axis of the optical system is smaller than an angle determined by sensitivity of a measurement error by the wavelength dividing element.

3. The apparatus according to claim 1, wherein the wavelength dividing element comprises a dichroic prism.

4. The apparatus according to claim 1, wherein the wavelength dividing element comprises a parallel plate dichroic mirror.

5. The apparatus according to claim 1, wherein the first illumination unit includes a blue LED, and the wavelength dividing element transmits light, of a wavelength of 450 to 470 nm.

6. The apparatus according to claim 1, further comprising a holding unit configured to fix and hold the first imaging element and the second imaging element to the optical system.

7. The apparatus according to claim 1, wherein the pattern light has a dot pattern.

8. The apparatus according to claim 1, wherein the second illumination unit illuminates the object evenly brightly with the light of the second wavelength.

9. The apparatus according to claim 1, wherein the processor obtains the three-dimensional shape of the object using the first image, and obtains the edge of the object using the second image.

10. The apparatus according to claim 9, wherein the processor performs model fitting between CAD data of the object and the three-dimensional shape of the object obtained from the first image and the edge of the object obtained from the second image, thereby obtaining information representing a position and orientation of the object.

* * * * *